Figure 1A:
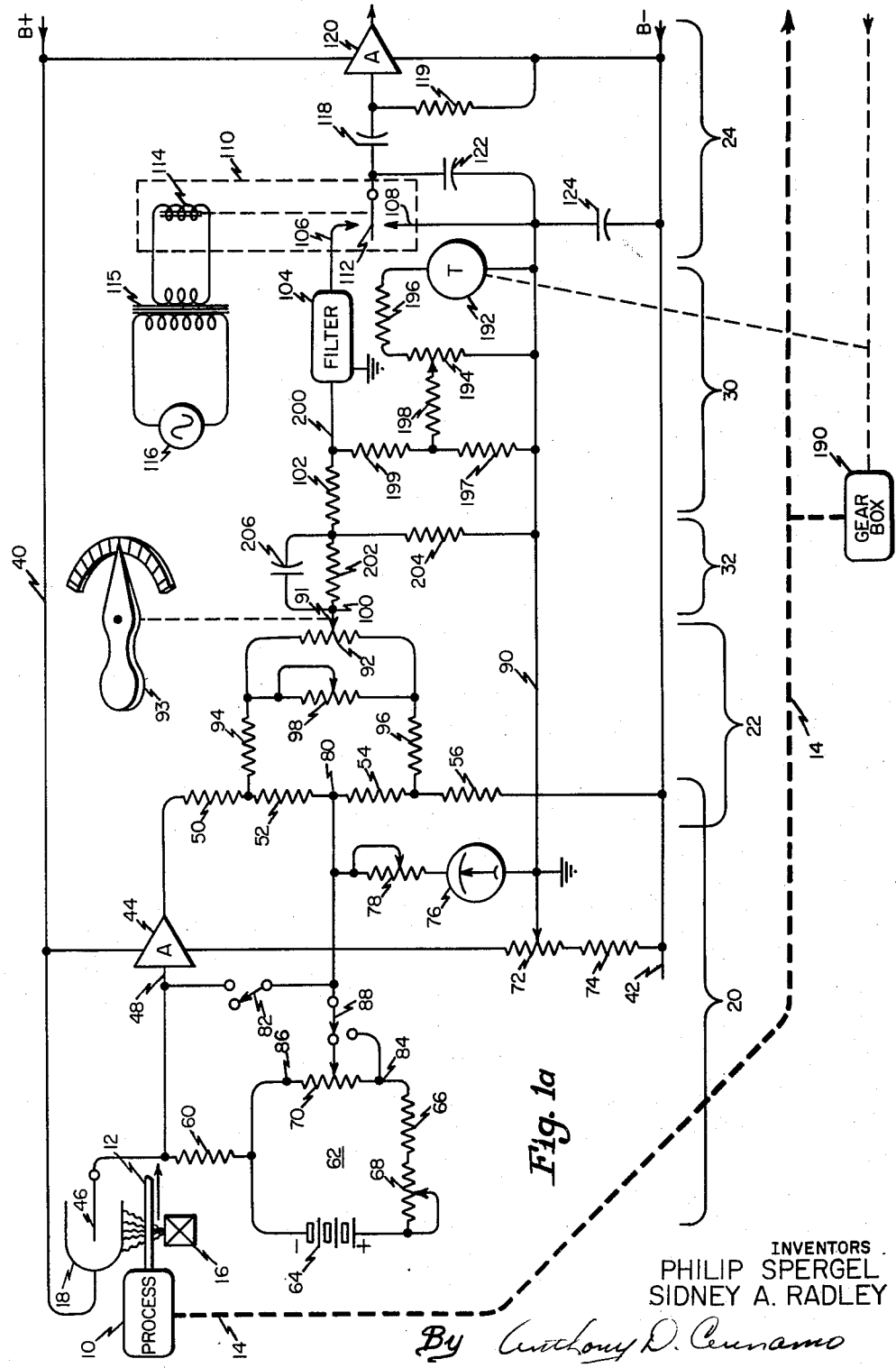

INVENTORS
PHILIP SPERGEL
SIDNEY A. RADLEY
By Anthony D. Cunnamo

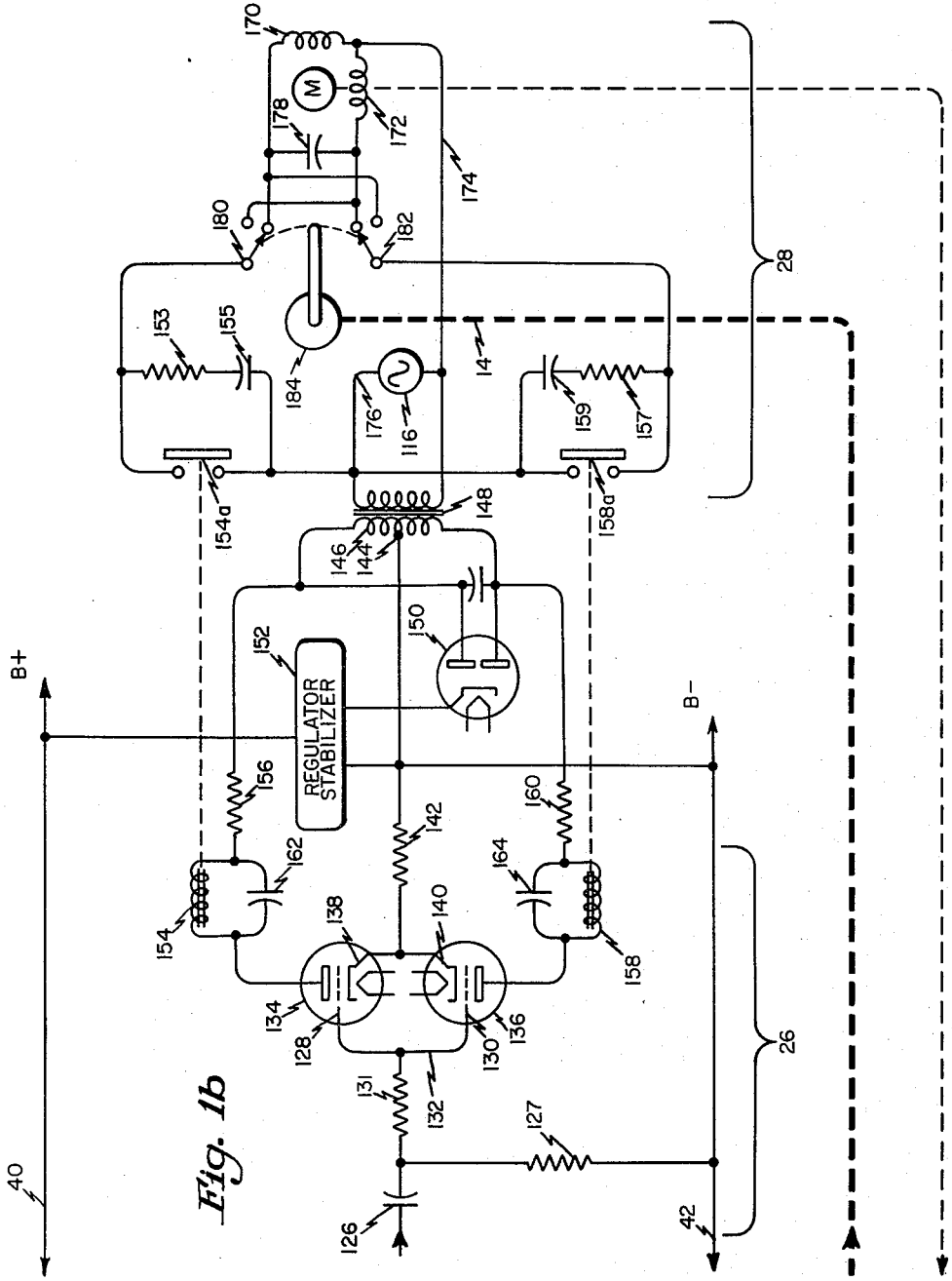

United States Patent Office 2,955,206
Patented Oct. 4, 1960

2,955,206
CONTROL SYSTEM

Philip Spergel and Sidney A. Radley, Columbus, Ohio, assignors to Industrial Nucleonics Corporation Filed Feb. 20, 1957, Ser. No. 641,414

11 Claims. (Cl. 250—83.3)

This invention relates generally to a system for controlling the physical or chemical properties of the product of a continuous process in accordance with measurements of the said physical properties, and more specifically it relates to a new and improved electronic feedback control system responsive to measurements provided by a nuclear radiation gauge for automatic regulation of an industrial process.

The invention has a wide range of applications in a variety of continuous process industries wherever a controllable characteristic of the product material can be determined by subjecting the said material to a nuclear radiation and measuring the characteristics of primary or secondary radiation transmitted, reflected or converted by interaction of the said nuclear radiation with the said material. Examples of such applications include control of the weight per unit area of thickness of a base sheet as in metals rolling, paper and boxboard manufacture, rubber and plastics calendering, extrusion processes and the like; control of weight per unit area or thickness of coatings or platings as in electrolytic tin or zinc plating lines, calender or knife coating of base sheets, spray or dip coating; impregnation or sizing processes; control of weight per unit length as in the manufacture of cigarettes, drafting of textile slivers, rovings, slubbings or yarn, extruding operations and the like; density control of fluid mixtures or control of the ratio of constituents in chemical processes. The invention will be illustrated and explained in conjunction with a nuclear instrument for measuring such variables, as is described in a co-pending application Serial No. 628,999, filed December 18, 1956, by Sidney A. Radley, for which use it is particularly well adapted, although by no means restricted thereto.

According to this invention, the output of a processing machine is automatically inspected for the material property of interest by a non-contacting nuclear gauge which provides an electrical signal output representing the measured value of the said property. This signal is compared with an electrical value obtained in a unique manner from the measuring amplifier of the nuclear gauge which represents a pre-determined desired value of the same property. The result of this comparison is the development of an error signal, in accordance with which an integrating velocity servo system is energized to readjust the appropriate controls governing the processing equipment, thereby to maintain the selected value of the measured material property substantially constant at the desired value.

The system has several important advantages over known devices presently utilized to control such processes. For example, control action is based on the time integral of the measured error rather than suffering from undue dependence on transient errors appearing as a result of the random and cyclical variations characteristic of such processes. The circuitry provides automatic compensation for electrical and mechanical delays having inertial characteristics, as well as maximum speed of response consistent with transportation lag for any given process application.

It is an object of this invention to provide a new and improved control system for regulating industrial processes of the type described hereinabove.

It is a further object to provide such a control system which may be readily adapted for installation on a great number of different types of commercial processing machines or apparatus with little or no modification thereof.

It is a still further object to provide such a control system which is simple to operate, requiring little or no training on the part of operating personnel.

It is also an object to make available, to process industries as above described, an improved regulating apparatus providing continuous control proportional to the time integral of the measured error, and which is therefore not unduly or disproportionately responsive to transient maxima occurring therein.

It is another object to provide a measuring and controlling apparatus wherein an error signal as well as a measurement signal is obtained directly from the measuring instrument, and wherein a simple and convenient direct-reading dial adjustment will accurately set the control point for the process regulating system.

Still another object is to provide a control apparatus which can be made available at relatively low cost and which requires a minimum of adjustment and maintenance.

Other objects and advantages will be apparent from the following description, taken in conjunction with the appended drawings.

In the drawings, when Figure 1a is placed alongside Figure 1b so that lines 40 and 42 adjoin, there is provided a complete schematic showing of a typical apparatus in accordance with the present invention.

Referring now to the drawing, the numeral 10 indicates a processing apparatus having a nuclear radiation gauge installed on the output thereof to measure a characteristic of the material 12 issuing in continuous fashion from the apparatus. It will be understood that the material 12 may be a solid, a liquid or a gaseous material passing through a conduit, or a combination or mixture of substances in one or a combination of physical states. The processing apparatus 10 is equipped with some form of control adjustment actuatable by means of a control shaft 14, whereby the value of the measured characteristic of the material 12 may be altered. The said characteristic is measured by the radiation gauge which preferably comprises a radiation source 16, a radiation detector 18, and suitable electronic circuitry indicated generally by the numeral 20 which converts the output of detector 18 directly into electrically translated values readable on the indicator 76 which has associated therewith a scale calibrated in the desired units of measurement. At 22 is an electrical network which includes a portion of the circuitry of the measuring device and wherein the electrical signal output of the gauge representing measured values is compared with an electrical value representing a predetermined desired value of the material property. As a result of this comparison there is derived a signal appearing at point 100 with respect to line 90 which represents the direction and magnitude of the deviation of the measured property from the desired value. In accordance with the error signal so derived, a servo device is actuated to drive the control shaft 14 of the processing machine 10 in a direction to correct the observed deviation, so as to quickly restore the correct value of the said measured property and maintain the same substantially constant at the predetermined desired value. The servo device comprises a high gain amplifier 24 with a chopper modulated input and providing essentially a square wave output, a phase demodulator relay output stage 26 which controls the application of power to the 2-phase servo motor actuator 28 which drives the process control adjustment 14 through reduction gears 190 and a rate generator feedback device 30 which provides a variable gain control together with the required damping in the overall feedback loop.

Proceeding now with a more detailed description, the radiation source 16 preferably comprises a hermetically sealed capsule containing a radioactive isotope selected to provide radiations suitable to the measurement requirements. The radiation detector 18 may be any suitable device such as a scintillation detector, Geiger-Mueller tube, crystal detector or an ionization chamber as is herein illustrated, also selected to provide the response characteristics necessary to the measurement of the appropriate physical property. In the illustrated embodiment of the invention, the source 16 is located on one side of the material 12 while the detector 18 is located on the opposite side thereof to measure relative absorption or other changes effected in the characteristics of the radiation beam due to its interaction with the material through which the beam is passed. In an equivalent arrangement, the relevant property is such that its measurement must or should be effected by locating the source 16 and detector 18 on the same side of the material 12, the circuitry of the measuring device being essentially identical in either case.

The detector 18 is furnished with a suitable unidirectional, stabilized operating voltage across leads 40 and 42, which also supply the measuring amplifier 44 and the control amplifier 120. The cathode 46 of the detector 18 is connected directly to the input terminal 48 of the measuring amplifier 44. The cathode follower output circuit of amplifier 44 comprises four load resistors 50, 52, 54 and 56 in a series circuit terminating on line 42, the B— side of the D.C. power supply. At 60 is a resistor of very high impedance connected to the cathode 46 of detector 18. As is known, the ionization chamber herein chosen to represent detector 18 passes very minute currents when exposed to ionizing radiations. As a result of this current flowing through resistor 60, a measurable voltage is developed thereacross, to provide the signal input to the electrical measuring system. Indicated generally at 62 is an opposing voltage source comprising an electrical network including a voltage source represented by the battery 64, resistor 66, and potentiometers 68 and 70. The opposing voltage, which appears between the variable tap of potentiometer 70 and the negative side 86 of the battery 64, is connected in series with the high resistance 60 into the input circuit of amplifier 44. The input tube (not shown) of amplifier 44 derives its filament current from lines 40 and 42 through a circuit which includes potentiometer 72 and resistor 74. An indicating and/or recording microammeter 76 is connected through switch 88 between the variable taps of potentiometers 70 and 72, in series with a potentiometer 78 which allows adjustment of the sensitivity of the meter indication. This circuit provides a suitable bias potential to the input of amplifier 44 which is adjustable by means of potentiometer 72. Since the variable tap of potentiometer 72 will conveniently serve as a reference point for voltages in the measuring system, it is preferably grounded as shown. The variable tap of potentiometer 70 is connected to the junction point 80 between resistors 52 and 54 in the output circuit of amplifier 44 to complete a negative feedback loop which maintains the input of the amplifier at essentially zero potential at all times despite relatively large voltage variations in the signal which may be applied thereto. This input consists of the algebraic sum of the voltage developed across resistor 60 as a result of the flow of ionization current therethrough and the voltage across the portion of potentiometer 70 between its variable tap and the negative side of the battery 64. The operating level of the amplifier 44 is initially set by closing the switch 82, thus shorting out all input signal, and by adjusting potentiometer 72 so as to cause the pointer of the indicator 76 to read zero in the center of its scale, that is, to bring point 80 to essentially ground potential. The measuring device is completely described and explained in the above identified co-pending application and, accordingly, the full details thereof are not included in this specification. Briefly, however, the gauge operates as follows:

The radiation falling on the detector 18 varies as a function of a property of the material 12. The electrical current through the detector varies proportionately with the said function, as does the voltage across resistor 60 which is dependent thereon. The voltage across resistor 60 is opposed by a second voltage of opposite sign which is set to a predetermined value by means of potentiometer 70. The difference between these voltages is the signal to which amplifier 44 responds by increasing or decreasing the potential at point 80, thus essentially cancelling the said difference voltage by inverse feedback applied through resistor 60 and networks 62 and maintaining the amplifier input on line 48 at substantially zero potential. Indicator 76 is energized by the feedback voltage, which, in view of the relatively very large impedance of resistor 60, is seen to be substantially equal to and 180 degrees out of phase with the said difference voltage. The extent of the indicator deviation from the center zero point is adjustable by means of potentiometer 78.

An explanation of the procedures of standardization and calibration of the gauge is essential to a full understanding of the invention and is briefly as follows for the simplest embodiment of the invention wherein the source 16 and detector 18 are located on opposite sides of a sheet material 12 to measure the thickness thereof. Switch 82 is closed to short out all input to amplifier 44, potentiometer 72 is adjusted until indicator 76 reads zero in the center of its scale, and switch 82 is reopened. The same zero reading of the indicator 76 will again obtain whenever the absolute value of the voltage developed across resistor 60 is equal to the voltage output of network 62. The output of network 62 appears between the movable tap of potentiometer 70 and point 86 which corresponds to maximum rotation of the potentiometer in one direction. Point 84 corresponds to a maximum rotation of potentiometer 70 in the opposite direction. The rotation of potentiometer 70 from end 84 to end 86 is indicated on a graduated dial divided into a number (usually 1000) of arbitrary and equal units. Points 84 and 86 respectively should ordinarily determine the maximum and minimum opposing voltage values equivalent to corresponding maximum and minimum values of voltage developed across resistor 60 when the output of detector 18 ranges from maximum to minimum. That is to say, in the illustrated system, if all absorbing material 12 is removed from between the source 16 and the detector 18, the detector may exhibit a maximum output current which will develop a maximum voltage across resistor 60. If at the same time potentiometer 70 is turned to its end 84 a maximum opposing voltage is obtained from the network 62. This maximum opposing voltage can be made equal and opposite to the voltage developed across resistor 60 by adjusting potentiometer 68 until proper balance is obtained, the null point being noted by a zero reading on the indicator 76. At the other extreme, if a material 12 of sufficient thickness to absorb all radiation is placed between the source 16 and the detector 18, there is no output therefrom and no voltage is developed across resistor 60. If at the same time potentiometer 70 is turned to its end point 86 so that there is no voltage output from the network 62, there is again obtained a zero reading on indicator 76. It is seen, therefore, that the divisions of the graduated dial provided on potentiometer 70 may be correlated with increments of absorber weight from zero to a thickness sufficient to prevent all radiation from the source 16 from reaching the detector 18. Hence by setting potentiometer 70 at a corresponding point, any desired value of thickness or weight may be chosen to produce a center scale reading on indicator 76. As above explained, any deviation in the material from this set point will deflect the indicator to the right or left of its zero center position, and by means of the span potentiometer 78 the extent of this deflection may be correlated with the amount of deviation of the material from the set point. The provision of the switch 88 makes it unnecessary to disturb the calibration setting of potentiometer 70 in order to standardize the gauge, since switching the point 80 to point 84 is equivalent to rotating potentiometer 70 to end-point 84. This method of standardization is more fully described in the above referenced co-pending application, and the brief explanation herein provided is accordingly considered sufficient. It will be understood that minor modifications of circuitry and standardization procedures will be necessary in different specialized cases, but these will in general become obvious once the general theory and procedure is understood.

It is seen that the measuring device 20 provides a D.C. signal appearing at point 80 with respect to ground 90 which accurately represents the measured value of the property of the material 12 which is to be controlled. This voltage representation is presented at point 80 with respect to that center scale value of the said property which is arbitrarily chosen to be placed at the center point of the scale associated with the indicator 76. However, a value so chosen for convenience of calibration or scale presentation does not necessarily coincide with the value at which it is desired to maintain the material property constant by means of the automatic control device. On consideration of the illustrated circuit, it is apparent that any point along the resistance path 50—56 will provide a voltage which is also functional of the measured values and that from a suitably chosen point thereon one may obtain such a voltage which is thus functional relative to any desired electrically translated value of the material property. Accordingly the range of such voltage values available across resistors 52 and 54 is applied across an isolating voltage divider network comprising the parallel combination of potentiometers 92 and 98 in series with fixed resistors 94 and 96. The more limited range obtainable across potentiometer 92 is adjustable by means of potentiometer 98, allowing potentiometer 92 to be equipped with a graduated dial 93 and accurately calibrated in units of measurement to agree with the scale of the measuring indicator 76. This dial 93 is used by the machine operator to select the control point at which it is desired to maintain material 12 constant. The calibration of this adjustment will be more fully described hereinafter.

The error signal obtained at the variable tap 91 of the control point setting potentiometer 92 is applied to the input of the control servo device at points 90 and 100. After modification by the lead network 32 and the rate feedback device 30 to be further explained, the signal is applied through isolation resistor 102 and a 60-cycle filter 104 to contacts 106 and 108 of a chopper 110 which includes a vibrating contact 112 driven by a coil 114 which is energized through transformer 115 from the conventional 115 v. A.C. power source 116. The chopped signal is coupled to the input of the servo amplifier 120 through capacitor 118, while capacitor 122 provides protection against arcing at the contacts of the chopper. Since the servo amplifier is adapted to receive an input with respect to the B— line 42 which is at a negative potential with respect to the ground reference for the gauge output signal, a blocking capacitor 124 of substantial electrical size is used to provide D.C. isolation between the two circuits while allowing the necessary A.C. coupling therebetween. Capacitor 124 also functions as a filter across resistor 74, so that with the 60-cycle filter 104 in the circuit stray voltage or line frequency pickup which could otherwise adversely affect the performance of the measuring instrument is effectively minimized.

The essentially square wave output of amplifier 120 is coupled through capacitor 126 to the control grids 128 and 130 of tubes 134 and 136 which grids are tied together through a common connection 132. The cathodes 138 and 140 are provided with a common cathode resistor 142 connected to the B— line 42 from the center tap 144 of the secondary winding 146 of transformer 148, which is fed from the conventional 115 v. A.C. power source 116. The secondary winding 146 of transformer 148 in conjunction with the full wave rectifier tube 150 and the voltage regulator/stabilizer 152 provides the plate voltage supply on lines 40 and 42 for the detector 18, measuring amplifier 44 and control amplifier 120. The ends of secondary winding 146 also supply voltage to the plate circuits of tubes 134 and 136. The plate circuit of tube 134 includes the coil 154 of a relay and a current limiting resistor 156 in series therewith. Similarly a relay coil 158 and a resistor 160 are connected in the plate circuit of tube 136. With respect to line 42, the voltages applied to the plate circuits of tubes 134 and 136 are 180 degrees out of phase with each other. By reason of their common connection, the voltages applied to the grids 128 and 130 of tubes 134 and 136 have the same phase. By means of a conventional phase shifting network in the amplifier 120, the phase angle of the voltage applied to the grids 128 and 130 is corrected if necessary so as to coincide with that of the plate voltage applied to one or the other of tubes 134 and 136, depending on the polarity of the D.C. signal into the chopper 110. That is to say, if there is an output from amplifier 120, there will be a signal on the grids 128 and 130 which is in phase with the plate voltage on one tube but 180 degrees out of phase with the other. Accordingly the tube with grid and plate voltages in phase will conduct on alternate half cycles of the supply voltage, energizing its plate relay 154 or 158. Relay operation is stabilized by capacitors 162 and 164 across relay coils 154 and 158 respectively. Contacts 154a and 158a of these relays control the application of power from the source 116 to the servo motor actuator 28.

The servo motor is a 2-phase capacitor-run type having a pair of field windings 170 and 172 connected at one end to one side 174 of the power source 116. The application of power to these windings is controlled by the relay contacts 154a and 158a, which are protected by suitable filters comprising resistors 153 and 157 and capacitors 155 and 159. With connections as shown, the closure of contacts 154a connects the other side of the power line 176 directly to winding 170 and to winding 172 through capacitor 178 which is of a size sufficient to shift the phase of the voltage across winding 172 by 90 degrees with respect to line 176. As a result of this phase difference, the motor will run in one direction. If contacts 158a close instead, winding 172 is connected directly to line 176 whereas winding 170 is energized through phasing capacitor 178, so that the motor will run in the opposite direction. These connections to the motor are made through snap action limit switches 180 and 182, one of which will be operated by the switch actuator 184 in the event the process control adjustment shaft 14 is driven to a point near the limit of its travel. Operation of a limit switch reverses the connections to the motor, so that, on operation of the output relay whose energization would otherwise drive the shaft further onto the limit, the motor rotation is reversed to automatically return the position of the shaft 14 into the operating range.

The servo motor, which drives the process control shaft 14 through reduction gears 190, also drives a tachometer generator 192 which develops a D.C. voltage having a polarity in accordance with its direction of rotation and a magnitude proportional to its speed. The tachometer output voltage appears across the voltage divider network of potentiometer 194 and resistor 196. Depending on the setting of potentiometer 194, a portion of the tachometer voltage is fed back through resistors 198 and 199 to the input of the servo amplifier 120 in opposition to the error signal voltage.

The servo amplifier 120 is designed to have an almost infinite forward gain so as to saturate on a very small input signal, so that ordinarily one or the other of relays 154 and 158 will be energized at all times. If the input voltage representing an error in the measured material property has a certain polarity, the servo motor 120 will be driven with full acceleration in one direction. If the error voltage has the opposite polarity, the motor will continue to accelerate in the opposite direction. The motor will continue to accelerate until the voltage derived from the tachometer becomes equal and opposite to the error signal, at which time the input to the servo amplifier on line 200 is reduced to a value approaching zero. At any greater speed the tachometer output through resistors 198 and 199 would become larger than the error signal through resistor 102 so that the input to the servo amplifier 120 would have the opposite polarity, tending to energize the servo motor to drive in the opposite direction. It can be seen that by this means the speed of the servo motor and the rate of readjustment of the control shaft 14 is maintained instantaneously proportional to the magnitude and direction of the error in the controlled process variable. Therefore, over any given period of time, the total amount of adjustment applied to the control shaft 14 is proportional to the time integral of the error signal received over the same period of time.

The rate of correction to the control shaft per unit of error is referred to as the "gain" of the control system. The maximum available gain of the system is dependent on the ratio selected for the speed reduction gears 190. The gain is variable over a suitable range by adjusting potentiometer 194 which determines the portion of the tachometer voltage which is fed back to cancel the error signal. Potentiometer 194 therefore determines the speed of the servo motor which will be maintained for a given amount of error in the controlled characteristic of material 12.

The maximum permissible gain of the control system is definitely limited by transportation lag, that is, the length of time required for the effect of a step change in the control setting to be observed as a change in the controlled characteristic of the material passing between the source 16 and the detector 18. If the gain is set too high, an existing error will be over-corrected before the gauge is able to "see" that sufficient correction has already been applied. Hence the process is caused to "cycle" or perform forced oscillations around the desired value of the material property. On the other hand, it is desirable to keep the gain as high as possible to secure optimum performance of the controller.

In addition to transportation lag, there may be other delays such as inertial type delays in the system which can, however, be compensated for to a great extent. Such factors will prevent an instantaneous change in the controlled characteristics of material 12 in response to a change in the setting of the process control adjustment represented at 14. The method of compensating for these delays is to provide a momentary over-correction for any rapid change in the observed error, and a means of accomplishing this result is the provision of the lead network 32 comprising resistors 202 and 204 and the capacitor 206. Where a constant error signal is present, the signal is divided by resistors 202 and 204, so that the portion of the signal across resistor 202 is not available as an input to the velocity servo. However, if there is a rapid change in the value of the error signal, the potential change is bypassed around resistor 202 through capacitor 206, so that a signal approaching the entire voltage change appears momentarily across resistor 204 alone as an input to the servo system. As a result, it may be said that the controller momentarily observes and attempts to correct for a larger error than actually exists in the measured process. The extra signal voltage may then decay according to the time constant of resistors 202 and 204 and capacitor 206, so that the overadjustment of the control 14 effected by the presence of the lead network may be corrected when the error signal approaches a steady state value.

The use of a saturating type control amplifier at 120 permits close regulation of the process without any appreciable "dead band," but introduces the problem of a low signal to noise ratio for small values of the error signal. It is found, however, that the preponderance of noise is in such phase relationship to the input signal that a null point of low minimum noise can be obtained by a slight biasing of the amplifier. Such a null point is automatically attained upon calibrating potentiometer 92, which operation is readily accomplished with the aid of switch 82, potentiometer 72, and the calibrated measuring indicator 76. By closing switch 82, all input signal from detector 18 is eliminated, whereupon a bias equivalent to any desired value of an input signal may be inserted into amplifier 44 by an adjustment of potentiometer 72, thus producing any desired reading on the indicating instrument 76. When any setting of the dial 93 on potentiometer 92 corresponds to the reading on indicator 76, the servo motor 28 should be essentially at rest, ignoring a slight "jitter." The positioning of the potentiometer dial 93 relative to the position of the wiper arm 91 determines the zero setting of the control adjustment, whereas potentiometer 98 is used to set the span thereof. It has been found convenient to place a pair of neon lamps (not shown) on the panel of the controller, said lamps being operated from auxiliary contacts of relays 154 and 158 to indicate the operation thereof, thus expediting the calibration of the controller adjustment when the operation of the motor is not directly observable.

While the invention has been described and illustrated in a specific embodiment wherein it is evident that the objects of the invention have been fully accomplished, it is also evident that a great many changes and modifications can be made in the disclosed apparatus without any departure from the essential principles of the invention. It must be clearly understood therefore that the particular means illustrated are to be considered as illustrative only and not restrictive of the scope of the invention as is set forth in the appended claims.

What is claimed is:

1. A system for controlling a variable characteristic in the product of a continuous material processing apparatus, comprising a processing means for continuously delivering processed material at the output thereof and including an adjusting means for varying the value of a selected characteristic of said processed material, a radioactive source of penetrative radiation and a radiation detector mounted near the material output side of said processing means for providing an electrical signal functional of the value of said selected characteristic, a first translating means comprising an electrical circuit for translating said functional signal into a range of electrical voltage units correlatable with chosen measurement units applicable to said selected characteristic, a second translating means for translating a predetermined value of said selected characteristic in said chosen measurement units into a particular voltage value in the range of said correlatable voltage increments, circuit means for comparing said particular voltage value and the output of said first translating means to provide an error signal voltage indicative of the difference therebetween, and an electromechanical integrator for repositioning said adjusting means in proportion to the time integral of said error signal voltage, said integrator comprising a control amplifier having an input receiving said error signal voltage, reversible motor means energized by said control amplifier for actuating said adjusting means for said processing means, means driven by said motor means for generating a voltage amplitude proportional to the rate at which said motor means actuates said adjusting means, and circuit means for adding a portion of said generated voltage to said error signal voltage in opposition thereto at the input of said control amplifier.

2. A system for controlling a variable characteristic in the product of a continuous material processing apparatus, comprising a processing means for continuously delivering processed material at the output thereof and including an adjusting means for varying the value of a selected characteristic of said processed material, a radioactive source of penetrative radiation and a radiation detector mounted near the material output side of said processing means for developing an electrical current functional of the value of said selected characteristic, an electrical impedance means connected to said detector for developing a first voltage proportional to said eletrical current, an adjustable electrical network including a voltage source for providing a second voltage opposing said first voltage; an amplifier responsive to the difference between said first and second voltages, said amplifier having an input terminal and an output circuit which includes a voltage divider; a feedback circuit which includes said electrical impedance and said opposing voltage network terminating at an intermediate point on said voltage divider for connecting the output of said amplifier to the input thereof so as to maintain said input at substantially zero potential; potentiometer means for tapping said voltage divider at a selected point thereon, a power source providing a unidirectional voltage for supplying power to said measuring amplifier, a second voltage divider connected across said power source, potentiometer means for tapping said second voltage divider at a selected point thereon, and control means responsive to any potential difference between said two selected points for actuating said adjusting means for said processing means, thereby to maintain the value of said selected material characteristic substantially constant.

3. A system for controlling a variable characteristic in the product of a continuous material processing apparatus, comprising a processing means for continuously delivering processed material at the output thereof and including an adjusting means for varying the value of a selected characteristic of said processed material, a radioactive source of penetrative radiation and a radiation detector mounted near the material output side of said processing means for developing an electrical current functional of the value of said selected characteristic, an electrical impedance means connected to said detector for developing a first voltage proportional to said electrical current, an adjustable electrical network including a voltage source for providing a second voltage opposing said first voltage; a measuring amplifier responsive to the difference between said first and second voltages, said measuring amplifier having an input terminal and an output circuit which includes a voltage divider; a feedback circuit which includes said electrical impedance and said opposing voltage network terminating at an intermediate point on said voltage divider for connecting the output of said measuring amplifier to the input thereof so as to maintain said measuring amplifier at substantially zero potential; potentiometer means for tapping said voltage divider at a selected point thereon, a power source providing a unidirectional voltage for supplying power to said measuring amplifier, a second voltage divider connected across said power source, potentiometer means for tapping said second voltage divider at a selected point thereon, an error signal appearing between said two selected points, a control amplifier having an input and an output, means for connecting said error signal to said control amplifier input, reversible motor means responsive to said control amplifier output for actuating said adjusting means for varying the value of said selected characteristic, means for generating a voltage amplitude proportional to the rate at which said motor means actuates said adjusting means, and adjustable circuit means for adding said generated voltage to said error signal in opposition thereto at said input of said control amplifier.

4. In a system for controlling a variable characteristic in accordance with a unidirectional electrical signal voltage amplitude proportional to the measured value of said characteristic, a variable voltage source; an amplifier having at least an input and an output stage, said output stage including a load resistance comprising a voltage divider; means for connecting said electrical signal voltage to the input of said amplifier in opposition to said variable voltage; an electrical feedback path connected from an intermediate point on said voltage divider through said variable voltage source to the input of said amplifier for maintaining the same at substantially zero potential; a parallel impedance comprising at least a potentiometer across at least that portion of said voltage divider which includes said intermediate point, a variable tap on said potentiometer, a power source providing a unidirectional voltage for supplying power to said amplifier, a second voltage divider connected across said power source, potentiometer means for tapping said second voltage divider at a selected point thereon, and control means responsive to any potential difference between said two selected points for readjusting the value of said variable characteristic so as to maintain the same substantially constant.

5. In a system for controlling a variable characteristic in accordance with a unidirectional electrical signal voltage amplitude proportional to the measured value of said characteristic, a variable voltage source; a measuring amplifier having at least an input and an output stage, said output stage including a load resistance comprising a voltage divider; means for connecting said electrical signal voltage to the input of said measuring amplifier in opposition to said variable voltage; an electrical feedback path connected from an intermediate point on said voltage divider through said variable voltage source to the input of said measuring amplifier for maintaining the same at substantially zero potential; a parallel impedance comprising at least a potentiometer across at least that portion of said voltage divider which includes said intermediate point, a variable tap on said potentiometer, a power source providing a unidirectional voltage for supplying power to said measuring amplifier, a second voltage divider connected across said power source, potentiometer means for tapping said second voltage divider at a selected point thereon a control amplifier having an input and an output, means for connecting said control amplifier input to the error signal voltage appearing between said two selected points, reversible motor means responsive to said control amplifier output for actuating said adjusting means for varying the value of said selected characteristic, means for generating a voltage amplitude proportional to the rate at which said motor means actuates said adjusting means, and adjustable circuit means for adding said generated voltage to said error signal in opposition thereto at said input of said control amplifier.

6. In conjunction with a material processing apparatus adapted for continuous delivery of a processed material at the output thereof and wherein said apparatus includes adjusting means for altering the value of a variable characteristic of said processed material, an automatic regulating system comprising sensing means including a source of radiation and a radiation detector responsive to said variable characteristic mounted near the output of said processing apparatus for producing an electrical signal voltage amplitude functional of the value of said variable characteristic, adjustable means for providing a voltage of predetermined amplitude opposing said signal voltage, a measuring amplifier having an input terminal and an output circuit including a load impedance comprising a first voltage divider; a power source providing a unidirectional voltage across a pair of leads for supplying power to said measuring amplifier, a second voltage divider connected across said leads including a first potentiometer having a variable tap, an electrical impedance connecting said tap to an intermediate point on said first voltage divider, means for connecting said signal voltage and said opposing voltage between said measuring amplifier input terminal and said intermediate point; a parallel impedance comprising at least a second potentiometer across at least that portion of said first voltage divider which includes said intermediate point, said second potentiometer having a variable tap; a control amplifier having an input and an output, means for connecting said control amplifier input to the error signal which comprises the potential difference between said variable taps of said first and second potentiometers, reversible motor means responsive to the output of said control amplifier for actuating said adjusting means included in said material processing apparatus, means for providing a generated voltage amplitude proportional to the rate at which said motor means actuates said adjusting means, and adjustable circuit means for adding at least a portion of said generated voltage to said error signal in opposition thereto at the input of said control amplifier.

7. In conjunction with a material processing apparatus adapted for continuous delivery of a processed material at the output thereof and wherein said apparatus includes adjusting means for altering the value of a variable characteristic of said processed material, an automatic regulating system comprising sensing means including a source of radiation and a radiation detector responsive to said variable characteristic mounted near the output of said processing apparatus for producing an electrical signal voltage amplitude functional of the value of said variable characteristic, adjustable means for providing a voltage of predetermined amplitude opposing said signal voltage, a measuring amplifier having an input terminal and an output circuit including a load impedance comprising a first voltage divider; a power source providing a unidirectional voltage across a pair of leads for supplying power to said measuring amplifier, a second voltage divider connected across said leads including a first potentiometer having a variable tap, an electrical impedance connecting said tap to an intermediate point on said first voltage divider, means for connecting said signal voltage and said opposing voltage between said measuring amplifier input terminal and said intermediate point; a parallel impedance comprising at least a second potentiometer across at least that portion of said first voltage divider which includes said intermediate point, said second potentiometer having a variable tap for selecting the reference point for the error signal voltage appearing between the variable taps of said first and second potentiometers, a control amplifier having an input and an output, a switch means connecting said error signal voltage to said control amplifier input, a source of alternating voltage, means for operating said switch means periodically at the frequency of said alternating voltage to alternately connect said error signal voltage to said control amplifier input and to reduce the same to zero, relay means responsive to the phase relationship between the output of said alternating voltage source and said control amplifier output, reversible motor means actuated by operation of said relay means for driving said adjusting means included in said material processing apparatus, means for generating a unidirectional voltage proportional to the rate of rotation of said motor means, and adjustable means for adding at least a portion of said generated voltage to said error signal voltage in opposition thereto at the input of said control amplifier.

8. In conjunction with a material processing apparatus adapted for continuous delivery of a processed material at the output thereof and wherein said apparatus includes adjusting means for altering the value of a variable characteristic of said processed material, an automatic regulating system comprising sensing means including a source of radiation and a radiation detector responsive to said variable characteristic mounted near the output of said processing apparatus for producing an electrical signal voltage amplitude functional of the value of said variable characteristic, adjustable means for providing a voltage of predetermined amplitude opposing said signal voltage, a measuring amplifier having an input terminal and an output circuit including a load impedance comprising a first voltage divider, a power source providing a unidirectional voltage across a pair of leads for supplying power to said measuring amplifier, a second voltage divider connected across said leads including a first potentiometer having a variable tap, an electrical impedance connecting said tap to an intermediate point on said first voltage divider, means for connecting said signal voltage and said opposing voltage between said measuring amplifier input terminal and said intermediate point; a parallel impedance comprising at least a second potentiometer across at least that portion of said first voltage divider which includes said intermediate point, said second potentiometer having a variable tap for selecting the reference point for the error signal voltage appearing between the variable taps of said first and second potentiometers, a control amplifier having an input and an output, a switch means connecting said error signal voltage to said control amplifier input, a source of alternating voltage, means for operating said switch means periodically at the frequency of said alternating voltage to alternately connect said error signal voltage to said control amplifier input and to reduce the same to zero, relay means responsive to the phase relationship between the output of said alternating voltage source and said control amplifier output, reversible motor means actuated by operation of said relay means for driving said adjusting means included in said material processing apparatus, means for generating a unidirectional voltage proportional to the rate of rotation of said motor means, adjustable means for adding at least a portion of said generated voltage to said error signal voltage in opposition thereto at the input of said control amplifier, and limit switch means actuated on overtravel of said process apparatus adjusting means for reversing the direction of rotation of said motor means.

9. A system as in claim 1 wherein said rate-proportional voltage generating means comprises a tachometer generator driven by said motor means, and wherein said adding means includes potentiometer means for adjusting the value of said generated voltage portion.

10. A system as in claim 1 which includes a set of speed reduction gears mechanically connecting said motor means and said adjusting means for said processing means, said gear set having a speed reduction ratio selected to match the transfer function of said processing means.

11. A system for controlling a variable characteristic in the product of a continuous material processing apparatus, comprising a processing means for continuously delivering processed material at the output thereof and including an adjusting means for varying the value of a selected characteristic of said processed material, a radioactive source of penetrative radiation and a radiation detector mounted near the material output side of said processing means for providing an electrical signal functional of the value of said selected characteristic, a first translating means comprising an electrical circuit for translating said functional signal into a range of electrical voltage units correlatable with chosen measurement units applicable to said selected characteristic, a second translating means for translating a predetermined value of said selected characteristic in said chosen measurement units into a particular voltage value in the range of said correlatable voltage increments, circuit means for comparing said particular voltage value and the output of said first translating means to provide an error signal voltage indicative of the difference therebetween, and an electromechanical integrator for repositioning said adjusting means in proportion to the time integral of said error signal voltage, said integrator comprising a control amplifier having an input and an output, a switch means connecting said error signal voltage to said amplifier input, a source of alternating voltage, means for operating said switch means periodically at the frequency of said alternating voltage to alternately connect said error signal voltage to said control amplifier input and to reduce the potential at said input to zero, relay means responsive to the phase relationship between said alternating voltage source and said amplifier output, reversible motor means controlled by said relay means for actuating said adjusting means for said processing means, means driven by said motor means for generating a voltage amplitude proportional to the rate at which said motor means actuates said adjusting means, and circuit means for adding a portion of said generated voltage to said error signal voltage in opposition thereto at the input of said control amplifier.

References Cited in the file of this patent

UNITED STATES PATENTS

| | | |
|---|---|---|
| 2,737,186 | Molins et al. | Mar. 6, 1956 |
| 2,790,945 | Chope | Apr. 30, 1957 |
| 2,829,268 | Chope | Apr. 1, 1958 |